Oct. 27, 1925.
M. J. CALLAHAN
1,559,069
ELECTRICAL CONTROL FOR DAMPERS FOR UNIT VENTILATORS
Filed May 13, 1920 2 Sheets-Sheet 1
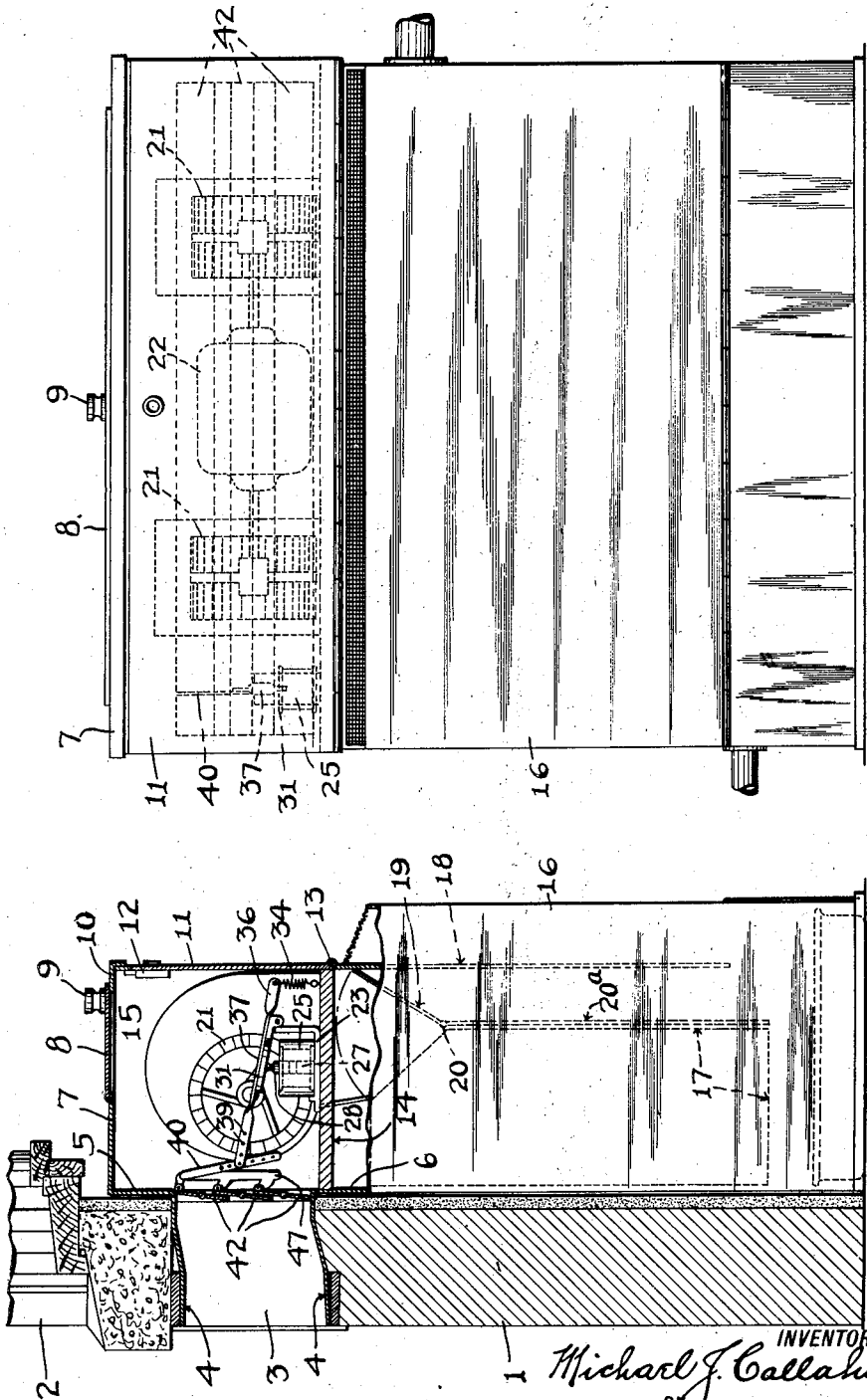
INVENTOR.
Michael J. Callahan,
BY
Chas. M. Chapman,
ATTORNEY.

Oct. 27, 1925.  1,559,069
M. J. CALLAHAN
ELECTRICAL CONTROL FOR DAMPERS FOR UNIT VENTILATORS
Filed May 13, 1920  2 Sheets-Sheet 2

INVENTOR:
Michael J. Callahan,
BY
Chas. M. Chapman,
ATTORNEY.

Patented Oct. 27, 1925.

1,559,069

UNITED STATES PATENT OFFICE.

MICHAEL J. CALLAHAN, OF NEW YORK, N. Y.

ELECTRICAL CONTROL FOR DAMPERS FOR UNIT VENTILATORS.

Application filed May 13, 1920. Serial No. 381,107.

*To all whom it may concern:*

Be it known that I, MICHAEL J. CALLAHAN, a citizen of the United States, residing in the borough of Manhattan, city, county, and State of New York, have invented a new and useful Improvement in Electrical Controls for Dampers for Unit Ventilators, of which the following is a description.

This invention has reference to ventilating apparatus of the unit type adapted for individual installation in schools, houses, lofts, basements and buildings generally, as well as where the installation of the usual type of ventilating systems would be impracticable or too expensive, and particularly has reference to electrical control of the dampers for such unit ventilators.

Among the objects of my invention may be noted the following: to provide a controlling means for unit ventilators by which the ingress of fresh air to the unit, or through the unit to the room, may be electrically controlled according to predetermination; to provide a controlling means for the fresh air damper of unit ventilators which enables the damper to be instantly opened when desired, or held closed as may be required or desired during any of the various operations of which the ventilator is susceptible; to provide electrically controlled means by which the motor for the fans may be set in operation without operating the damper or dampers for the ingress of fresh air; to provide electrically operated means by which the damper for the ingress of fresh air may be opened, and closely followed, in point of operation, by the rotation of the motor and blowers; to provide a unit ventilating apparatus with a multiple damper capable of being operated to permit the ingress of air to the apparatus and controlled electrically so as to operate both the damper and motor and blowers according to predetermination; and to provide in connection with the foregoing apparatus a rheostatic device which may be hand controlled to bring about the desired results in the apparatus.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 1 is a sectional elevation, parts being broken away, looking at the apparatus from one end, embodying my invention;

Figure 2 is a front elevation of Figure 1 showing a ventilating unit, and showing the position of my controlling means in dotted lines;

Figure 3:
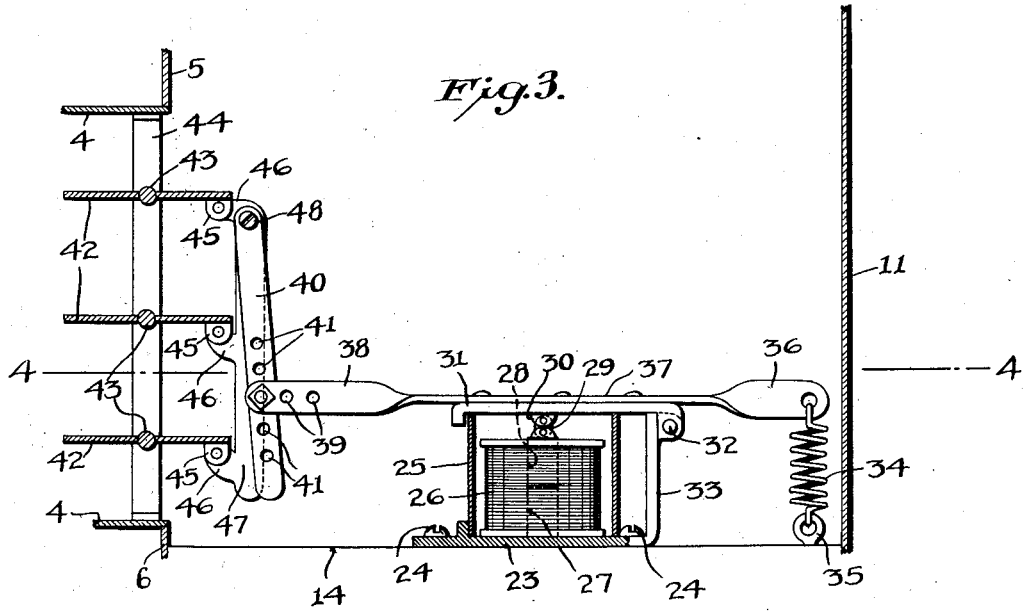
Figure 3 is a sectional elevation of a detail, on an enlarged scale, showing the multiple damper and magnetic means for actuating the same.

Referring to the drawings, the numeral 1 indicates the wall of a building having a window or other opening and surrounding framing for the opening, as usual, and generally indicated by 2. I desire it understood, however, that the passage 3 for the inlet of air to my ventilating unit may be through the wall of the building, or through flues from any point or place where air can be obtained and which may be found most convenient, or suitable for the installation. Inserted in the opening 3 is the outwardly extended casing member 4 of the ventilating unit, the same being extended upwardly, as at 5, and downwardly, as at 6, within the wall of the room or other space in which the installation is made. The casing member 5 is extended horizontally into the room, as at 7, and is provided with a hinged cover 8 adapted to be operated by the handle or knob 9 and to rest, at its front edge, upon the ledge 10 of the frame. The front of the frame or casing, at its top, is also provided with a closure 11 having a spring lock 12 or other locking medium. The closure 11 is hinged at its bottom edge at 13 to the lower casing part, at the position of the shelf or support 14 which divides the blower and motor space 15, in the upper part of the casing, from the lower part of the casing 16, wherein a radiator 17, baffle 18 and damper 19 are arranged, the damper 19 being pivotally mounted at 20 upon the partition 20ª. These parts are all the same as in my Patent 1,503,089, granted July 29, 1924, and need not be described in further detail, since they form no part of my present invention. The blowers or fans are indicated at 21 and are driven by the motor 22, all shown in dotted lines in Figure 2, and they are supported upon the shelf or support 14.

Adjacent the left end of the ventilating unit, viewing Figure 2, and see particularly Figure 1, the casing of an electromagnet is mounted upon the shelf 14, the base 23 of the casing, Fig. 3, being held in place by a plurality of screws 24 suitably disposed for securely fastening the casing in place. The cylindrical inclosing member 25 of the casing extends upwardly from the base 23 and incloses a magnetic coil 26, the stationary core member 27 of which extends upwardly from the bottom of the spool. A movable section 28 of the core is suspended within the bore of the coil or spool so as to rest normally upon the upper end of the stationary core member 27. The movable core member 28 is pivotally connected to link 29, in turn pivotally connected to the lug 30 on the cap or cover 31 of the casing, said cover normally closing the top of the casing in which the core is located so as to avoid admission of dust, etc., under operative conditions, as when the damper is open. The cover 31 is hinged, as at 32, to the upright portion 33 of the base member 23, so as to swing upwardly in the arc of a circle under the influence of the spring 34 hooked at 35, at its lower end, to the support 14, and, at its upper end, hooked to the rear end 36 of a bar 37, which is rigidly secured substantially midway its length to the cover 31, and having its forwardly extending end 38 provided with a plurality of apertures 39 adapted to receive a screw or bolt to secure the same to the link 40 provided with a plurality of apertures 41 adapted to receive the said bolt and pivotally connect the bar end 38 and link 40 adjustably together. In the casing extension 4 a multiple damper is pivoted, the same consisting of a plurality of damper members 42 pivoted at 43 to the opposite sides of the casing extension 4, or to strips or bars 44 secured thereto. Each of the damper members 42 is provided with a depending ear 45, to which is pivotally connected a lug 46 extending from the connecting bar 47, the said connecting bar joining together the damper members for simultaneous and synchronous operation, so that, under the influence of the electromagnet and spring 34, the damper members may be swung on their pivots so as to admit air to the unit ventilator or completely shut off the air, the simultaneous and synchronous operation of the damper members being through connection of bar 47 at its upper end pivotally, as at 48, with the link 40. In the position of the parts shown in Figure 3, the multiple damper is wide open for the full ingress of air to the unit ventilator, and the magnet, in consequence, has full control of the multiple damper through the connecting lever mechanism, the tension or strength of the spring 34 having been entirely overcome. At this time, it will be understood the motor 22 is in full operation and is driving the fans or blowers 21.

Figure 4:
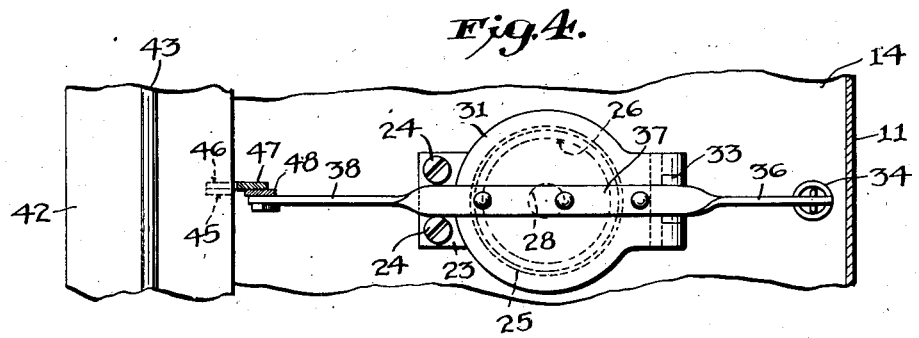
Figure 4 is a top plan view of Figure 3.
Figure 5:
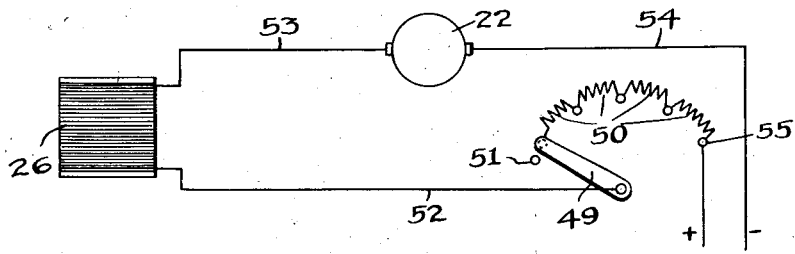
Figure 5 is a diagrammatic view showing the wiring of the electrical controlling means and the magnet, the motor and the rheostat in series.

In the diagram of Figure 5, the motor 22 is conventionally indicated, as is also the electromagnet 26, and, in addition thereto, the lever of the rheostat is indicated by 49 and the various resistances by 50. 51 is the non-circuit button or rest for the lever 49. The positive and negative leads are indicated by the usual signs, the same extending from, as will be readily understood, any suitable source of power. The current following the positive lead goes through the resistances 50 of the rheostat, the lever 49, lead 52, to the coil of the magnet 26, from thence by lead 53, motor 22, and from thence by lead 54 to the negative side of the source of power. With the foregoing details of construction, the following mode of operation will be readily understood:

It will be, of course, understood that the mains of the circuit emanate from any suitable source of power, which may be a generator or a service line supplying 110 volts. The normal position of the parts, with the current turned off and the multiple damper closed, is shown in Figure 1 of the drawings, Figures 3 and 4 illustrating an operative position wherein the magnet has opened the multiple damper and is holding the same open in opposition to the spring 34. When it is desired to open the multiple damper and start the ventilating unit into operation, the switch arm 49 is shifted from the neutral button 51 quickly to the extreme contact button 55, thus cutting out all resistance in the rheostat and sending the full charge of current through the lever 49, lead 52, to the coil 26. The coil is energized and the upper core member 28 is immediately sucked in, drawing down the bar 37 against the tension of spring 34 and causing the bar 37 to operate upon the link 40 to draw down the bar 47 and open to the fullest the damper members 42, turning them upon their axes. At the same time, the motor will be started into operation and will quickly reach its maximum, driving the blowers 21 and forcing air downwardly through the opening in support 14 and into contact with the radiator or not, according to the position of the damper 19, which may be set anywhere along the dotted arc line, as set forth in my aforesaid co-pending application. If it is desired to start the motor and blowers without opening the multiple damper, the feat can be accomplished by gradually cutting out the resistance between the extreme left of the rheostat and the right hand contact 55. This will be readily understood when it is realized that the motor may be started into operation on a comparatively low voltage, approximately 35 volts, and that it requires approximately the full force of the current operating through the magnet 26 to draw down the bar 37 against the tension spring 34 and the mechanical friction and weight of the bar 37, link 40, connecting rod 47 and damper members 42. When the motor is in full operation, which may be produced gradually by shifting the switch-bar 49 from contact point to contact point between the points 51 and 65, Figure 5, it is then impossible for the current to energize the magnet sufficiently to cause the same to operate the multiple damper, as heretofore described.

Having thus described my invention, what I claim and desire to secure by Letters Patent is:

1. In combination with a heating and ventilating unit having a chamber for the reception of air to be driven through the unit, a port for the admission of air to the chamber, a damper for controlling said port; and means for actuating said damper located in the said chamber, including a motor, a magnet in circuit therewith, and lever mechanism connecting the damper and magnet, whereby the admission of air to the chamber may be controlled.

2. In combination with a heating and ventilating unit having a chamber for the reception of air to be driven through the unit, a port for the admission of air to the chamber, a damper for closing said port; means for controlling the action of the damper including a lever mechanism connected to the damper for actuating the latter; and electrical means for controlling the lever mechanism comprising a housing to which a part of the lever mechanism is pivotally connected, an electromagnet within the housing having a movable core, and a pivotal connection between the latter and said part of the lever mechanism.

3. In combination with a heating and ventilating unit having a chamber for the reception of air to be driven through the unit; a port for the admission of air to the chamber; a damper for closing said port; means for controlling the action of the damper including a lever mechanism connected to the damper for actuating the latter; and electrical means for controlling the lever mechanism comprising an electromagnet having a two-part core, one part of which is movable, and means connecting said movable core part to the lever mechanism.

4. In combination with the multiple damper of a ventilating apparatus, a bar connecting the damper members for simultaneous operation; a link pivotally connected to the bar; a lever and means adjustably connecting it with the link; a spring for moving the lever in one direction; and a motor for actuating the lever in the opposite direction whereby the multiple damper is controlled.

5. In combination with the damper of a ventilating apparatus, mechanism for operating said damper comprising a lever and means for adjustably and pivotally connecting the lever to the damper; a spring for shifting the lever in one direction; and a motor for shifting the lever in opposition to the spring.

6. In combination with the damper of a ventilating apparatus, mechanism for operating said damper comprising a lever; an electromagnet for actuating said lever having a core in two parts, one of which is movable; a pivotal connection between said lever and movable core part, and a pivotal connection between said lever and said damper.

7. In combination with the damper of a ventilating apparatus, mechanism for operating said damper comprising an electromagnet having a core in two parts, one of which is movable; a housing for the magnet having a pivotally mounted cover; a pivotal connection between the cover and movable core part; a bar fixed to the cover; a spring connected to the bar normally lifting the cover and core; and a pivotal connection between the bar and damper.

8. In combination with a unit ventilator having a blower, an electric motor for actuating the blower, and a port for admitting air to the blower chamber, a damper for closing the port, and controlling means for the damper including electrical means for holding it in one position and mechanical means for shifting the damper to and holding it in another position.

9. In the combination substantially as set forth in claim 8, the electrical means including an electromagnet in circuit with the motor, and rheostatic means in series with the magnet, and means whereby the magnet and the motor may be operated approximately simultaneously.

10. In the combination substantially as set forth in claim 8, the electrical means including a magnet with a stationary core and a movable core arranged in end to end relation, a rheostat, and said magnet being in series with the motor and the rheostat whereby both the magnet and the motor may be brought into operation approximately simultaneously.

11. In the combination substantially as set forth in claim 8, the electrical means including a rheostat composed of a plurality of resistances in series, a magnet in series with the rheostat and the motor, and means whereby the resistances of the rheostat may be gradually cut out to enable the motor to be operated without operating the magnet and damper, or whereby the entire current may be conveyed to the magnet to energize the latter and operate the damper to open the same approximately simultaneously with the starting of the motor.

MICHAEL J. CALLAHAN.